Patented Dec. 17, 1940

2,225,004

UNITED STATES PATENT OFFICE

2,225,004

PRINTING PASTE FOR PRINTING TEXTILES

Charles Graenacher, Riehen, and Paul Streuli, Basel, Switzerland, assignors to Society of Chemical Industry in Basle, Basel, Switzerland No Drawing. Application February 21, 1939, Serial No. 257,718. In Switzerland February 26, 1938

6 Claims. (Cl. 8—62)

The present invention relates to a new process for producing colored prints on textiles. It comprises the process itself and also the new printing colors used for producing the prints.

In Patents Nos. 2,095,600 and 2,120,741 and 2,170,262, as well as in French Patents Nos. 815,575 and 828,532 there are described water-soluble acyl derivatives of sparingly soluble dyestuffs free from sulfo-groups and carboxyl groups, which are characterized by containing at least once the group —x—R, wherein x stands for a member of the group selected from —O— and —N—, and R stands for an acyl radical containing at least one group imparting solubility in water to the acyl derivative. These acyl derivatives are obtained by causing to react, in the presence of a tertiary base, preferably pyridine, dyestuffs containing at least one salt forming group incapable of forming salts stable to water selected from the group consisting of —OH— and —NH— groups, with acylating agents containing at least one acid halide group and at least one group which imparts increased water-solubility to the formed product. Treated with saponifying agents these new acyl derivatives have the valuable property of splitting off the acyl radical imparting solubility in water, whereby the sparingly soluble parent dyestuff is regenerated. Owing to this property the new acyl derivatives are excellently suited for producing fast colored prints on textiles. The production of colored prints with such acyl derivatives has been described in Patents Nos. 2,095,600 and 2,120,741 and 2,170,262.

The present invention is based on the observation that the new water-soluble acyl derivatives yield especially good results in printing when the printing color comprises in addition an unsymmetrical alkylated urea, if desired in admixture with other printing additions, for instance urea itself, an alkali phosphate, a thiodiglycol ether, S-ethylthioglycollic acid amide, resorcinol or the like. The prints thus obtained and subsequently developed are characterized by their purity and tinctorial strength. On artificial silk and artificial staple fibre their tints are particularly beautiful.

A further object of the invention is the production of the new printing pastes to be applied according to the new process. They are a composition of matter containing as characteristic constituents a thickening, the new acyl derivatives, and an unsymmetrical alkylated urea. The term "unsymmetrical alkylated ureas" includes products such as methyl urea, unsymmetrical dimethylurea, ethylurea, unsymmetrical diethylurea, n-propylurea, isopropylurea, and butylurea, as well as unsymmetrical alkylated ureas whose alkyl radicals do not contain more than 4 carbon atoms. Dyestuffs suitable for producing the acyl derivatives which are applied here, are, for example, azo-dyestuffs which are produced by coupling diazotized amines with hydroxy-compounds capable of coupling, provided that the diazo-compound and the coupling component do not contain groups lending solubility or contain groups lending so little solubility that the dyestuff produced is practically insoluble in water. The coupling components may contain a hydroxyl group, which determines the coupling, in an isocyclic- or heterocyclic ring, or in an open chain. Besides the azo-dyestuffs, dyestuffs of other classes are suitable, for instance dyestuffs of the anthraquinone series which contain a hydroxyl group; also hydroxyl derivatives of suitable dyestuffs of the azine, oxazine, thiazine, arylmethane and pyrone series.

Insoluble dyestuffs, in which the salt forming group which yields no salt stable to water is an $NH_2$ or NH, may themselves belong to the aforesaid dyestuff series. They may also, for instance, be condensation products of cyanuric chloride with amines, which still contain chromophore groups, for example azo-groups.

The water-soluble decomposable derivatives of water-insoluble dyestuffs of the kind described above, which are required in the invention, are obtained by the action of a compound having at least one acid halide group and at least one substituent which of itself or after suitable change determines an enhanced solubility of the product. Such compounds are, for instance, aliphatic, cycloaliphatic, aliphatic-aromatic or aromatic carboxylic acid halides or sulfonic acid halides, for example acid chloride or acid bromides. Specific instances are sulfoacetyl chloride, sulfofuranecarboxylic acid chloride, sulfobenzoylchloride, benzoic acid sulfochloride, benzenehexacarboxylic acid dichloride and -trichloride, naphthalenetrisulfochloride, products of reaction of sulfur trioxide on benzoyl chloride and of chloro-sulfonic acid on benzoic acid. The said acid halide groups are in condition to react with the aforesaid salt-forming groups of the dyestuffs to form compounds capable of scission. The further substituent present in the acid halide molecule, which determines the enhanced solubility of the product of reaction, either of itself or after suitable change, may be any group capable of dissociation, for instance a carboxyl group or a sulfonic acid group, which has the effect that the compound obtained can pass into solution as an anion.

Substituents which after suitable change, enhance the solubility of the product obtained, are, for example, halogen atoms which can combine with a tertiary amine, for instance pyridine, trimethylamine or triethylamine, to form quaternary ammonium compounds and produce the effect that the compound obtained can pass into the solution as a cation. In the same sense other substituents are effective, for instance tertiary amino-groups, which can combine with halogen hydrocarbons to form quaternary compounds, also thio-ethers or the like.

Reaction between the aforesaid insoluble dyestuffs and the aforesaid acid halides may be conducted with advantage by heating together the two components in a tertiary base acting as a solvent, for instance pyridine. Further data on the manufacture of the acyl derivatives used here are found in the patents and patent applications hereinbefore mentioned.

For carrying out the new process there are particularly valuable and acyl derivatives of the general formula $R_1$—O—$R_2$, in which $R_1$ represents a radical derived from a sparingly soluble azo-dyestuff containing at least one OH-group which is incapable of forming salts stable against water, and $R_2$ represents an acyl radical containing at least one group causing the solubility of the product; further among the products of the above explained general formula $R_1$—O—$R_2$ those are again particularly valuable wherein $R_1$ represents a radical derived from a sparingly soluble azo-dyestuff obtained itself from a diazo-compound free from carboxyl- and sulfo-groups combined with an arylide of the 2:3-hydroxynaphthoic acid which is also free from sulfo-groups and carboxyl-grounds, and wherein $R_2$ represents a benzoyl radical containing at least one and at the most two sulfo-groups.

The following examples illustrate the invention:

Example 1

A printing paste is prepared containing the following ingredients:

80 grams of the product of the action of benzoic acid meta-sulfo-chloride and the azo-dyestuff from diazotized 2:5-dichloraniline and the ortho-anisidide of 2:3-hydroxynaphthoic acid
270 grams of water
150 grams of unsymmetrical diethyl urea
500 grams of neutral starch tragacanth thickening 1000 grams This paste is printed on white cotton and the goods are dried, steamed in the Mather-Platt apparatus for 5–10 minutes and then treated for 5 minutes in a solution containing per litre 10 grams of barium chloride and 7–10 grams of sodium hydroxide. They are then thoroughly rinsed, soured hot, again rinsed and soaped at the boil. Bright scarlet red very fast prints are obtained.

Example 2

A printing paste is prepared of the following constituents:

50 grams of the product of the action of benzoic acid meta-sulfo-chloride on the azo-dyestuff from diazotized 4-benzoylamino-2:5-diethoxy-1-amino-benzene and the anilide of 2:3-hydroxynaphthoic acid
300 grams of water
150 grams of mono-ethyl urea
500 grams of neutral starch tragacanth thickening 1000 grams This paste is printed on white cotton and the goods are dried and steamed for 5–10 minutes in the Mather-Platt apparatus and then treated for 5 minutes in a solution containing per litre 10 grams of barium chloride and 7–10 grams of sodium hydroxide. They are then thoroughly rinsed, soured hot, again rinsed and soaped at the boil. A fast blue print is obtained.

Example 3

A printing paste comprises the following constituents:

80 grams of the product of the action of benzoic acid meta-sulfochloride on the azo-dyestuff from diazotized 2:5-dichloraniline and the ortho-anisidide of 2:3-hydroxynaphthoic acid
270 grams of water
100 grams of a mixture consisting of 2 parts of mono-ethyl urea and 1 part of unsymmetrical diethyl urea
550 grams of neutral starch tragacanth thickening 1000 grams This paste is printed on white cotton, the goods are dried, steamed in the Mather-Platt apparatus for 5–10 minutes and then treated for 5 minutes in a solution containing per litre 10 grams of barium chloride and 7–10 grams of sodium hydroxide. They are then thoroughly rinsed, soured hot, again rinsed and soaped at the boil. There is obtained a very fast bright scarlet red print.

Similar effects are obtained if instead of the unsymmetrical ethylated urea, monomethyl urea, unsymmetrical dimethyl urea or propyl urea or a mixture of any of these is used.

Example 4

A printing paste contains the following constituents:

80 grams of the product of the action of benzoic acid meta-sulfochloride on the azo-dyestuff from diazotized 2:5-dichloraniline and the ortho-anisidide of 2:3-hydroxynaphthoic acid
270 grams of water
150 grams of a mixture consisting of 2 parts of monoethyl urea and 1 part of urea
500 grams of a neutral starch tragacanth thickening 1000 grams This paste is printed on viscose artificial silk fabric and the goods are dried, steamed in the Mather-Platt apparatus for 5-10 minutes and treated for 5 minutes in a solution containing per litre 10 grams of barium chloride and 7-10 grams of sodium hydroxide. They are then thoroughly rinsed, soured hot, again rinsed and soaped at the boil.

There is obtained a very fast bright scarlet red print.

A similar printing effect is obtained if instead of starch tragacanth thickening there are used thickening agents such as tragacanth alone, British gum, kernel meal of carob beans, or dextrinated starches.

*Example 5*

A printing paste contains the following constituents:

80 grams of the product of the action of benzoic acid meta-sulfochloride on the azo-dyestuff from diazotized 3-chloraniline and the anilide of 2:3-hydroxynaphthoic acid
150 grams of unsymmetrical diethyl urea
240 grams of water
500 grams of neutral starch tragacanth thickening
30 grams of trisodium phosphate solution 1:2

1000 grams

A material consisting of cotton, artificial silk or regenerated cellulose, natural silk or wool or of a mixture of two or more of these fibres is printed with this paste and the goods are dried, steamed in the Mather-Platt apparatus for 5-10 minutes and then at room temperature drawn through an approximately saturated solution of common salt containing per litre 6-7 grams of sodium hydroxide: they are then lightly squeezed and then left in rolled up or folded condition at room temperature for 15-30 minutes. They are then rinsed cold, soured hot, rinsed and soaped at the boil for 10-15 minutes. There is obtained an intense bright orange-red print.

*Example 6*

2 printing pastes are prepared according to the following prescription:

(a) 80 grams of the product of the action of acid meta-sulfochloride on the azo-dyestuff from diazotized 2:5-dichloraniline and the ortho-anisidide of 2:3-hydroxynaphthoic acid
220 grams of water
150 grams of unsymmetrical diethyl urea
550 grams of neutral starch tragacanth thickening 1000 grams (b) 150 grams of a paste of 20 per cent strength of tetrabromindigo
650 grams of potash thickening
80 grams of sodium sulfoxylate formaldehyde
80 grams of urea
40 grams of water 1000 grams The potash thickening used in the foregoing prescription comprises:

| | Grams |
|---|---|
| Wheat starch | 110 |
| Water | 170 |
| Tragacanth thickening 60:1000 | 250 |
| British gum | 200 |
| Potassium carbonate | 170 |
| Glycerine | 100 |
| | 1000 |

The two printing pastes are simultaneously printed by a 2-roller machine on cotton and the goods are dried, steamed for 5-10 minutes in the Mather-Platt apparatus and then treated in a reeling vat for 5 minutes at 25° C. with a solution containing per litre

| | | |
|---|---|---|
| Barium chloride | grams | 20 |
| Caustic soda solution of 36° Bé | cc | 50 |
| Common salt | grams | 50 |
| Sodium nitrobenzene sulfonate | do | 4 |

The goods are then rinsed and handled for 2 minutes in a solution at 50° C. containing per litre 4 grams of sulfuric acid and 1 gram of potassium bichromate. They are then again thoroughly rinsed and soaped at the boil. There is obtained a fast bright scarlet and blue 2-color print.

*Example 7*

5 parts by weight of the product of the action of benzoic acid meta-sulfochloride on the azo-dyestuff from diazotized mono-benzoyl-2:5-diaminohydroquinone-diethyl ether and 2:3-hydroxynaphthoic acid anilide, 30 parts of water and 50 parts of starch tragacanth thickening and 15 parts of monoethyl urea are together worked up to form a printing paste. The latter is printed on a fabric which may consist of cotton, artificial silk from regenerated cellulose, natural silk, wool or a mixture of two or more of these fibres. The goods are dried, steamed for 10 minutes in the Mather-Platt apparatus, and subjected at 80-100° C. for 3-5 minutes to a moist atmosphere containing ammonia; they are then rinsed and soaped. There is obtained a fast intensely blue print.

*Example 8*

A printing paste is prepared from the following constituents:

80 grams of the product of the action of benzoic acid meta-sulfochloride on the tertiary condensation product from 1 mol cyanuric chloride, 2 mols of 2-aminoanthraquinone and 1 mol of aniline
150 grams of unsymmetrical diethyl urea
170 grams of water
600 grams of crystal gum 1:2

1000 grams

A cotton fabric is printed with this paste, dried and steamed for 7-10 minutes in the Mather-Platt apparatus; the goods are then drawn at room temperature through a solution containing per litre

| | | |
|---|---|---|
| Caustic soda solution of 36° Bé | cc | 50 |
| Barium chloride | grams | 20 |
| Common salt | do | 150 |

They are then lightly squeezed and left in rolled up or folded condition for 10-15 minutes.

They are then rinsed cold, soured hot, again rinsed and soaped at the boil for 10–15 minutes. There is obtained an intense fast yellow print.

The prescriptions of the foregoing examples can of course also be applied to further acyl derivatives which come into consideration here. Such acyl derivatives as well as the color tints which they produce on cotton or regenerated cellulose are indicated in the following table:

ence of pyridine, of a sparingly soluble azo-dyestuff which is itself obtained by uniting a diazo-compound free from sulfo and carboxyl groups with an arylide of 2:3-hydroxynaphthoic acid, with halides of aromatic acids of the benzene series which contain one carboxyl group and at least one sulfonic group and unsymmetrical alkylated ureas whose alkyl radicals do not contain more than 4 carbon atoms.

| | Azo-dyestuff from— | Acylating agent— | Color of the print produced on cotton or regenerated cellulose |
|---|---|---|---|
| 1 | Aminochloranisol (OCH₃NH₂Cl 1:2:4) → 2:3-hydroxynaphthoic acid-ortho-anisidide. | Benzoic acid-3-sulfochloride | Red. |
| 2 | Nitrotoluidine (CH₃NH₂NO₂ 1:2:4)→2:3-hydroxynaphthoic acid-anilide | do | Do. |
| 3 | 4-(4'-methyl)-phenoxyacetyl-amino-2:5-diethoxy-1-aminobenzene → 2:3-hydroxynaphthoic acid-anilide | do | Blue. |
| 4 | 2:5-dichloraniline → 2:3-hydroxynaphthoic acid-ortho-anisidide | do | Red. |
| 5 | 4-chlorbenzene-azo-4'-amino-3'-methoxynaphthalene → 2:3-hydroxynaphthoic acid-anilide. | do | Blue. |
| 6 | 4:4'-diaminodiphenylether → 2:3 hydroxynaphthoic acid-anilide | do | Red. |
| 7 | 2:5-dichloraniline → 2:3-hydroxynaphthoic acid-anilide | Benzoic acid 3:5-disulfochloride | Do. |
| 8 | Aminochloranisol (OCH₃NH₂Cl 1:2:4) → 2:3-hydroxynaphthoic acid ortho-anisidide. | do | Do. |
| 9 | Aniline → β-naphthol | do | Orange. |
| 10 | Aniline → 2:4-dihydroxyquinoline | do | Yellow. |
| 11 | Dianisidine → β-naphthol | Sulfosalicylic acid-dichloride | Blue. |
| 12 | 4-amino-azobenzene → β-naphthol | Benzoic acid-3-sulfochloride | Bordeaux. |
| 13 | 3:3'-diaminobenzanilide → para-cresol | do | Yellow. |
| 14 | Ortho-aminoazotoluene → β-naphthol | 1-benzoylamino-3-benzene-carboxylic acid acid-3':5'-disulfochloride. | Bordeaux. |
| 15 | Ortho-aminoazotoluene → para-cresol | 1:3:6-naphthalene-trisulfonic acid-chloride. | Brown. |
| 16 | 1-aminonaphthalene → anilide of 2:3-hydroxy-naphthoic acid | 1:3:6-naphthalene-trisulfochloride | Bordeaux. |
| 17 | Meta-chloraniline → anilide of 2:3-hydroxy-naphthoic acid | Naphthoic acid-disulfochloride | Orange. |
| 18 | 4-(4'-methoxy)-phenoxy-acetylamino-2:5-dimethoxy-1-aminobenzene → anilide of 2:3-hydroxynaphthoic acid. | Furane-α.α'-sulfocarboxylic acid chloride | Blue. |
| 19 | Dianisidine → β-naphthol | 4-chlormethyl-benzoyl chloride in presence of pyridine. | Violet. |
| 20 | 2-methyl-4:4'-diamino-5-methoxyazobenzene → β-naphthol | do | Do. |
| 21 | 1-naphthylamine → β-naphthol | do | Bordeaux. |
| 22 | do | Nicotinic acid chloride in presence of pyridine. | Do. |
| | *Dyestuff from—* | | |
| 23 | 4-benzoylamino-3:2'-dimethylazobenzene | Benzoic acid-3:15-disulfo chloride | Yellow. |
| 24 | Condensation product from 2 mols 4-aminoazobenze and 1 mol 2:4-dichloro-quinazoline. | do | Do. |
| 25 | Condensation product from 3 mols 4-amino-3:2'-dimethylazobenzene and 1 mol cyanuric chloride. | do | Do. |
| 26 | 2-acetylaminoanthraquinone | Benzoic acid-3:5-disulfochloride | Do. |
| 27 | Condensation product from 1 mol cyanuric acid chloride, 2 mols 1-amino-4-methoxyanthraquinone and 1 mol ammonia. | Benzoic acid meta-sulfochloride | Red. |
| 28 | Condensation product from 1 mol cyanuric acid chloride, 1 mol 4-aminoazobenzene, 1 mol aniline and 1 mol 2-aminoanthraquinone. | Sulfo-chloracetic acid chloride | Yellow. |
| 29 | Condensation product from 1 mol cyanuric chloride, 2 mols 2-aminoanthraquinone and 1 mol aminopyrene. | Para-μ-chloro-methyl-benzoyl chloride (in presence of pyridine). | Do. |
| 30 | Condensation product from 1 mol cyanuric chloride, 1 mol aniline and 2 mols 4-amino-3:2'-dimethylazo-benzene. | do | Do. |
| 31 | 4-benzoylaminoazo-benzene | do | Do. |
| 32 | 1:5-dibenzoyldiamino-4:8-dihydroxyanthraquinone | Benzoic acid-3:5-disulfochloride | Blue-violet. |
| 33 | 1-hydroxy-4-para-tolyl-amino-anthraquinone | do | Do. |
| 34 | 1:5-diamino-4:8-dihydroxy-anthraquinone | Benzoic acid-3-sulfochloride | Do. |
| 35 | Benz-2-benz'-2'-dihydroxy-dibenzanthrone | do | Green. |
| 36 | 1:5-dibenzoyldiamino-4:8-dihydroxyanthraquinone | Chloromethylbenzoyl-chloride | Blue-violet. |
| 37 | Benzene-2-benzene-2'-di-hydroxydibenzanthrone | do | Green. |

What we claim is:

1. As a new composition of matter, a printing paste for printing textiles containing in addition to a thickening as characteristic constituents water-soluble acyl-derivatives of sparingly soluble dyestuffs free from sulfo-groups and carboxyl-groups obtained by the reaction, in presence of pyridine, of a dyestuff containing at least one salt forming group incapable of forming salts stable to water selected from the group consisting of —OH— and —NH— groups, with acylating agents containing at least one acid halide group and at least one group which imparts increased water-solubility to the formed products and unsymmetrical alkylated ureas whose alkyl radicals do not contain more than 4 carbon atoms.

2. As a new composition of matter, a printing paste for printing textiles containing in addition to a thickening as characteristic constituents water-soluble acyl-derivatives of sparingly soluble dyestuffs free from sulfo-groups and carboxyl-groups obtained by the reaction, in presence of pyridine, of a sparingly soluble azo-dyestuff which is itself obtained by uniting a diazo-compound free from sulfo and carboxyl groups with an arylide of 2:3-hydroxynaphthoic acid, with halides of aromatic acids of the benzene series which contain one carboxyl group and at least one sulfonic group and unsymmetrical alkylated ureas whose alkyl radicals do not contain more than 4 carbon atoms.

3. In the production of prints on textiles by printing the same with printing colors which in addition to thickening agents contain as characteristic constituents water-soluble acyl derivatives of sparingly soluble dyestuffs free from sulfo-groups and carboxyl-groups obtained by the reaction, in presence of pyridine, of a dyestuff containing at least one salt forming group incapable of forming salts stable to water selected from the group consisting of —OH— and —NH— groups, with acylating agents containing at least one acid halide group and at least one group which imparts increased water-solubility to the formed product, and saponifying the water-soluble acyl-derivatives, the step which consists in printing with a printing color which contains as further characteristic constituents unsymmetrical alkylated ureas whose alkyl radicals do not contain more than 4 carbon atoms.

4. In the production of prints on textiles by printing the same with printing colors which in addition to thickening agents contain as characteristic constituents water-soluble acyl-derivatives of sparingly soluble dyestuffs free from sulfo-groups and carboxyl-groups obtained by the reaction, in presence of pyridine, of a dyestuff containing at least one OH-group incapable of forming salts stable to water, with acylating agents containing at least one acid halide group and at least one group which imparts increased water-solubility to the formed product and saponifying the water-soluble acyl-derivatives, the step which consists in printing with a printing color which contains as further characteristic constituents unsymmetrical alkylated ureas whose alkyl radicals do not contain more than 4 carbon atoms.

5. In the production of prints on textiles by printing the same with printing colors which in addition to thickening agents contain as characteristic constituents water-soluble acyl-derivatives of sparingly soluble dyestuffs free from sulfo-groups and carboxyl-groups obtained by the reaction, in presence of pyridine, of an azo-dyestuff containing at least one OH-group incapable of forming salts stable to water, with acylating agents containing at least one acid halide group and at least one group which imparts increased water-solubility to the formed product and saponifying the water-soluble acyl-derivatives, the step which consists in printing with a printing color which contains as further characteristic constituents unsymmetrical alkylated ureas whose alkyl radicals do not contain more than 4 carbon atoms.

6. In the production of prints on textiles by printing the same with printing colors which in addition to thickening agents contain as characteristic constituents water-soluble acyl-derivatives of sparingly soluble dyestuffs free from sulfo-groups and carboxyl-groups obtained by the reaction, in presence of pyridine, of a sparingly soluble azo-dyestuff which is itself obtained by uniting a diazo-compound free from sulfo and carboxyl groups with an arylide of 2:3-hydroxy-naphthoic acid, with halides of aromatic acids of the benzene series which contain one carboxyl group and at least one sulfonic group, and saponifying the water-soluble acyl-derivatives, the step which consists in printing with a printing color which contains as further characteristic constituents unsymmetrical alkylated ureas whose alkyl radicals do not contain more than 4 carbon atoms.

CHARLES GRAENACHER.
PAUL STREULI.